US007345951B2

(12) United States Patent
Broto et al.

(10) Patent No.: US 7,345,951 B2
(45) Date of Patent: Mar. 18, 2008

(54) METHOD OF DETERMINING SPECULAR INFORMATION AFTER PRESTACK SEISMIC IMAGING

(75) Inventors: Karine Broto, Rueil-Malmaison (FR); Laurence Nicoletis, Rueil-Malmaison (FR); Héry Rakotoarisoa, Villepreux (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 11/295,640

(22) Filed: Dec. 7, 2005

(65) Prior Publication Data

US 2006/0133208 A1 Jun. 22, 2006

(30) Foreign Application Priority Data

Dec. 7, 2004 (FR) .................................. 04 13003

(51) Int. Cl.
*G01V 1/00* (2006.01)
(52) U.S. Cl. .............................. 367/53; 367/50; 702/18
(58) Field of Classification Search ................. 367/53, 367/50; 702/14, 16, 18
See application file for complete search history.

(56) References Cited

U.S. PATENT DOCUMENTS 6,094,621 A * 7/2000 Hanitzsch et al. ............ 702/16
2002/0183980 A1 12/2002 Guillaume

FOREIGN PATENT DOCUMENTS

FR 2755243 4/1998
WO WO 00/54074 9/2000

OTHER PUBLICATIONS

Bleistein, Norman: "On the Imaging of Reflectors in the Earth", Geophysics, Society of Exploration Geophysicists, Tulsa, US, vol. 52, No. 7, Jul. 1, 1987, pp. 931-942, XP002095154, ISSN: 0016-8033.
Bleistein, Norman, et al: True-Amplitude Transofrmation to Zero Offset of Data from Curved Reflectors, Geophysics, Society of Exploration Geophysicists, Tulsa, US, vol. 64, No. 1, Jan. 1, 1999-Feb. 28, 1999, pp. 112-129, XP002276525.

* cited by examiner

*Primary Examiner*—Mark Hellner
(74) *Attorney, Agent, or Firm*—Antonelli, Terry, Stout & Kraus, LLP.

(57) ABSTRACT

Method of determining the specular source/receiver pairs associated with seismic images produced from a transformation of multi-offset seismic wave records as a function of time in the depth domain.

When using a prestack depth migration algorithm of Kirchhoff type, one also calculates and saves, in addition to the necessary traveltimes of the rays from the sources and receivers of the acquisition device to the image points of the image to be migrated, the line parameters of these rays and the desired quantities to be reached in fine. Then, once the prestack migrated volume produced, the local slopes of seismic events of interest for the image points considered are extracted. Comparison between line parameters saved during migration and the normal to the local slopes at the image points considered shows which ray is specular among those for which information has been saved, and allows to produce then the required quantity, which is then referred to as specular quantity.

Application: subsoil seismic imaging for example.

26 Claims, 1 Drawing Sheet

METHOD OF DETERMINING SPECULAR INFORMATION AFTER PRESTACK SEISMIC IMAGING

BACKGROUND OF THE INVENTION

1. Field of the Invention

In general terms, the invention relates to seismic data processing and, more particularly, the present invention allows accessing information referred to as specular information after transformation of temporal seismic records in the depth domain. This depth migration is carried out by means of a prestack depth migration algorithm of Kirchhoff type for imaging an underground zone. These quantities can be used directly or as intermediaries for algorithms intended to update the velocity model of an underground zone, such as tomography algorithms.

2. Description of the Prior Art

Reflection shooting is widely used in oil exploration. This technique supplies temporal information relative to the subsoil from the information contained in the seismic waves propagated and reflected on the geological discontinuities of the medium. By approximation, the propagation and the reflection of the seismic waves are approximated by rays that are propagated in a complex velocity domain and are reflected on a reflector (geologic interfaces or various heterogeneities of part of the subsurface) according to Snell's law.

Seismic imaging methods use the kinematic information associated with seismic reflections, that is the arrival times of the waves, to determine a velocity representation of the subsoil.

From this information on the subsoil velocity, it is possible to change a temporal image of the subsoil into a depth image, by means of an algorithm referred to as depth migration algorithm. This technique first defines the geometric parameters of the desired depth image of the subsoil. This image is a set of points referred to as image points. Then, the associated temporal seismic information (amplitudes) is associated with each image point.

The following documents mentioned in the course of the description below illustrate the state of the art:

Stork, C., 1992, Reflection Tomography in the Postmigrated Domain: Geophysics, 57, 680-692, Bishop, T. N., Bube, K. P., 1985, Tomographic Determination of Velocity and Depth in Laterally Varying Media: Geophysics, 50, No. 6, 903-923, Ehinger, A., and Lailly, P., 1995, Velocity Model Determination by the SMART method, Part 1: Theory: $65^{th}$ Ann. Internat. Mtg., Soc. Expl. Geophys., Expanded Abstracts, pp. 739-742, Bleistein, N., 1987, On the Imaging of the Reflectors in the Earth: Geophysics, 52 (7), 931-942, Schneider, W. A., 1978, Integral Formulation for Migration in Two and Three Dimensions: Geophysics, 43, 49-76.

Prestack migration is a conventional method of processing seismic data. In general terms, the technique consists, in knowing the value of a wavefield at a known depth, at the surface for example, and a model of the wave propagation velocity distribution in the underground zone, in modelling the propagation of the source field and the back propagation of the recorded reflection data, and in seeking phase coherences between these two modelled fields.

If a correct subsoil velocity model is available, the depth migration constructs a depth image on which a structural interpretation of the subsurface can be achieved, by a geologist for example. This depth image of the subsoil is generally referred to as depth migrated image. In three dimensions, it is referred to as depth migrated cube.

In the opposite case, that is if no correct subsoil velocity model is available, depth migration allows, on the one hand, evaluation of the quality of a velocity model and, on the other hand, to produce information allowing this velocity model to be improved. The tomographic methods appear among the methods which allow use of this information resulting from depth migration to update the velocity model.

In the domain referred to as prestack domain, that is prior to summation of the temporal records from various offsets, there are two main tomography types: tomographies referred to as prestack depth tomographies and tomographies referred to as prestack time tomographies.

Thus, prestack depth tomographies (Stork, 1992) are based on the fact that, if the velocity model used for a prestack depth migration is correct, then the seismic events appear flat in the iso-x collections (sections at a given lateral position in the depth migrated cube). If this is not the case, the information contained in the iso-x collections, that is the variability as a function of the reflector image offset, is used in order to update the subsoil velocity model. However, to correctly use this information, it is necessary to know the coordinates of the sources and receivers that have constructively contributed to the image of the reflector at each point of the iso-x collection considered. Now, after depth migration, this information, referred to as specular, is unknown.

Prestack time tomographies (Bishop et al., 1985) come up against the same problem. In fact, in the case of complex structures, access to the input data of these methods, that is prestack traveltimes, can be difficult or even impossible directly in the time domain. In such cases, a departure will be made in the depth migrated domain, followed by a stage referred to as kinematic demigration in order to convert this information collected in the depth domain to temporal information (Ehinger and Lailly, 1995). Now, the demigration stage uses ray tracing from an image point considered in the prestack depth migrated domain to the specular sources and receivers which are here, again, postmigrated unknown quantities.

Thus, whether in the depth domain or in the time domain, access to the space coordinates of the specular sources and receivers of a seismic image is therefore necessary for the velocity model updating methods which use the information collected in the depth migrated domain, such as tomographic methods. Now, depth migration algorithms lose this information during migration.

Solutions are currently under development in the industry. These solutions, derived from the stationary phase theory, carry out different migrations using the same data and the same velocity model, but for different migration operators (Bleistein, 1987). More precisely, in addition to the conventionally calculated depth migrated cube, other cubes are calculated by weighting the migration operator itself by the desired quantities (for example the position of the sources and the position of the receivers). Then, by calculating the ratio of the conventional cube to the weighted cubes, an estimation of the desired specular quantities is obtained. This approach has two major drawbacks. First of all, this technique may be costly in calculation time costly insofar as several migrations (as many migrations as desired specular quantities) have to be performed. Besides, this approach can lead to erroneous specular quantity values when the signal-to-noise ratio is low, and also in zones where the amplitudes are low, which may occur in the case of complex structures.

the invention allows access to specular quantities after prestack depth migration of the temporal seismic records, quantities that are necessary notably for updating the velocity model of seismic waves.

SUMMARY OF THE INVENTION

The invention relates to a method allowing determination of the specular source/receiver pairs associated with image points. These image points are obtained from one or more images of an underground formation resulting from multi-offset records, as a function of time, of seismic waves emitted and picked up by an acquisition device comprising seismic sources and seismic receivers coupled at the surface with said underground formation, these seismic waves being reflected by geologic interfaces of said formation.

The term "specular" is often used in the description hereafter. It is an adjective indicating a relation with a specular reflection, that is, a reflection for which the major part of the signal is reflected in accordance with the laws of geometric optics. Thus, what is referred to as the specular ray of an image point of a prestack class is the ray which, among all those having reached the same image point, has constructively contributed to imaging at this point and which meets the Snell-Descartes laws of reflection when the image point is on a reflector.

What is referred to as specular information is thus any information, having a physical sense or not, that is associated with a specular ray. This information corresponds for example to the coordinates of the source/receiver pair of the specular ray, to the traveltime of this specular ray, to the angle of incidence of the specular ray, to the partial derivatives of the traveltime of the specular ray in relation to the velocity model used for the migration algorithm.

The method comprises:

a) defining a selection of image points of the images of the formation comprising at least one image point and adjacent points (to be able to later determine a local slope of at least one event);

b) carrying out a prestack depth migration (of Kirchhoff type) for the selection of image points wherein data relative to the sources and receivers of the acquisition device, the ray parameters of the rays defined between any source/image point pair and the ray parameters of the rays defined between any receiver/image point pair are determined and stored;

and, for at least one image point of the selection, the following is carried out:

c) determining, for the image point, the local slope of at least one seismic event corresponding to reflections impacting one of the geologic interfaces of the formation;

d) determining the specular source/receiver pairs associated with the image point, by comparing the local slope associated with the image point with the line parameters associated with the image point.

According to the invention, the specular source/receiver pairs associated with the image point can be determined by selecting, from among all the source/receiver pairs of the acquisition device, those whose vector made up of the sum of the ray parameters associated with the image point (this vector being referred to as migration dip) is the most colinear to the normal to the local slope associated with said image point.

The data stored during the migration in stage b) can comprise at least one of the following information:

the traveltimes of the rays defined between any source/image point pair and any receiver/image point pair;

the coordinates of the sources and receivers of the acquisition device;

for any image point, the migration dips associated with the source/receiver pairs that have contributed to imaging of the image point;

the partial derivatives of the traveltimes in relation to a velocity model used for implementing the prestack depth migration algorithm; and any combination of these data.

According to the invention, these data stored during stage b) can be associated with each specular pair and stored during stage d).

The local slopes used by the method can be determined from an interpretation of a seismic event.

According to the invention, to accelerate calculations, the ray parameters and the data relative to the sources and receivers of the device can be calculated and stored for a decimated representation of the image points and a representation, also decimated, of the sources and receivers of the acquisition device. Reconstruction of all these data can be performed from interpolations and/or extrapolations.

The method according to the invention can for example be applied to updating of a distribution model of the velocities of propagation of the seismic waves in the underground zone. A depth tomography technique or a time tomography technique can be used to update the model.

According to the invention, if a depth tomography technique is used, it is possible to determine the partial derivatives of the traveltimes in relation to a velocity model used for implementing the prestack depth migration algorithm, necessary for the depth tomography technique, by evaluating and by storing the information on the derivatives in stage b).

Similarly, if a time tomography technique is used, the traveltimes necessary for the time tomography technique can be determined by storing the information on the traveltimes in stage b).

BRIEF DESCRIPTION OF THE DRAWINGS

Other features and advantages of the method according to the invention will be clear from reading the description hereafter of non limitative examples, with reference to the accompanying FIGURE described below.

DETAILED DESCRIPTION OF THE INVENTION

Figure 1:
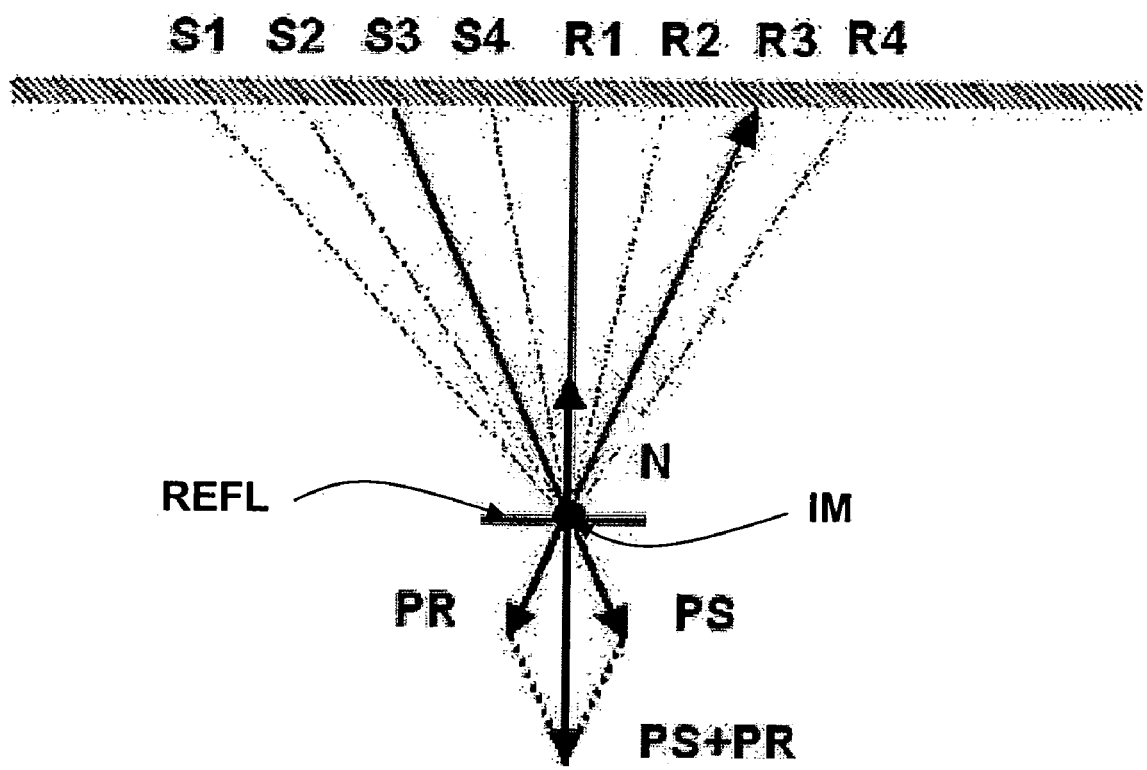
FIG. 1 illustrates the technique allowing determination of the specular source/receiver pair (S3-R3) of a considered image point considered (IM) for a class: it is the pair whose migration dip (PS+PR) is as colinear as possible to the normal (N) to the local slope of the event interpreted (REFL).

Implementation of the reflection shooting technique is achieved using a seismic acquisition device conventionally comprising seismic sources and receivers, as well as a seismic signal recording laboratory. The sources emit seismic waves propagated in the subsoil, and the whole of the seismic receivers coupled with the medium pick up the waves reflected by the subsoil discontinuities in response to the waves emitted. Finally, the laboratory records the seismic signals picked up by the receivers for obtaining multi-offset seismic records.

A velocity representation of the subsoil is also available. This representation corresponds to a velocity model, that is a geometrical representation of the subsoil discretized in space, with which a seismic wave velocity value is associated at each discretization point.

Finally, a Kirchhoff type prestack depth migration algorithm (for example, Schneider, 1978) working either by offset class or by angle class is available.

From the time information relative to the subsoil (multi-offset seismic records) and from a first velocity model of the subsoil, the method according to the invention then comprises the two major stages as follows:

1. Carrying out a Kirchhoff type prestack depth migration of a selection of image points allowing access to the migration dip of the points.

2. Determining the specular source/receiver pairs associated with the images of said formation, by means of the migration dips.

The method according to the invention is presented through a first implementation mode. In this implementation, other information is obtained providing the coordinates of the specular sources and receivers associated with image points of a prestack depth migrated image. This specular information is the most fundamental because it is always possible, from this information and a ray tracing tool, to deduce other specular quantities for the same image points.

1—Prestack Depth Migration

A Kirchhoff type prestack depth migration algorithm comprises two stages: calculation of the asymptotic Green functions and the imaging stage.

After acquisition of the multi-offset seismic data, a Kirchhoff type prestack depth migration during which the following stages are carried out is performed:

a) During the stage of asymptotic Green function calculation, for each image point of the depth image, in addition to the traveltimes of the source/image point and receiver/image point rays, conventionally calculated, the ray parameters are retained (vectors normal to the wave fronts giving the direction of propagation of the waves) of each one of the rays. Discriminant information on the position of all the sources and all the receivers of the acquisition device is also saved. This discriminant information can be, for example, their space coordinates or their reference number in the acquisition device;

b) during the imaging stage, the source/receiver pairs are classified by angle or offset class, depending on the type of prestack depth migration selected. Classes are therefore defined by selecting a range of values, for example class 1 corresponds to the angles in the 0°-5° range, class 2 to the 5°-10° range, . . . . Then, for each class, their image is constructed by summation of the amplitudes associated with the sources and receivers belonging to this class. The discriminant information of stage a) is then saved only for the pairs thus classified. The migration dip of these pairs is also saved. As shown in FIG. 1, the migration dip of a pair (S3,R3) is defined by the sum (PS+PR) of the source (S3)/image point (IM) ray parameters (PS) and of the image point (IM)/receiver (R3) ray parameters (PR) of this pair. This information, for each image point of each class, is for example stored in an external file.

2—Determination of the Specular Sources and Receivers c) Once the prestack depth migration is completed, the local slopes of the events of interest (seismic events corresponding to reflections impacting one of the geologic interfaces of the formation) are determined for each class, for a selection of image points or at any image point of the prestack migrated image (from the class images). Access to the local slopes can result from manual or automatic interpretation of the events in question. If it is desired to access specular information only for a selection of image points, care is preferably taken to also migrate the directly adjacent points so as to be able to estimate the local slopes at the image points selected. The local slope at each interpreted image point of each prestack class can then be stored in an external file, for each offset or angle collection selected for the migration;

d) then, the specular pair is determined from the file containing the information on the source/receiver pairs that have contributed to the image points of the prestack classes considered (stage b) and from the file containing the local slopes at the image points considered of the classes considered (stage c). As shown in FIG. 1, the source/receiver pair (S3-R3) whose migration dip (PS+PR) is as colinear as possible to the normal (N) to the local slope of the event interpreted (REFL) at the same image point of the same class is selected for each image point (IM) considered of each class considered. The discriminant information associated with this specular pair can then be stored in an external file, for each image point of each class considered.

According to the method, it is also possible to obtain other specular information than the discriminant information on the position of the specular sources and receivers associated with image points of the prestack depth migrated volume. This information can be, for example, traveltimes, partial derivatives related to these traveltimes, velocities, etc. In this case, the procedure is as follows:

during stage a) described above, any element allowing gaining access in fine to this other information is calculated and saved;

during stage b) described above, the desired information is calculated and saved;

during stage d) described above, this information is extracted and saved.

According to an embodiment, the method according to the invention can be used within the scope of updating of the velocity model of an underground zone.

Velocity Model Updating

This discriminant information on the coordinates of the specular sources and receivers of the prestack depth migrated image can then be used to update the velocity model, for example by means of a tomographic method.

In prestack time tomography for example, the information on the coordinates of the specular sources and receivers is used to achieve kinematic demigration of the prestack migrated volume. This demigration is carried out by ray tracing on the interpreted events and by using the same velocity model as the model used for prestack depth migration. The traveltimes required for prestack time tomography are thus obtained, which allows the velocity model to be updated.

In prestack depth tomography, the information on the coordinates of the specular sources and receivers is also used for ray tracing. The model used is the same as the model used for prestack depth migration, but here in order to obtain the partial derivatives of the traveltimes in relation to the velocity model used for migration. These quantities are necessary for updating the velocity model. A description of the ray tracing principle can be found in:

Jurado, F., Lailly, P., and Ehinger, A., (1998), *"Fast 3D Two-Point Raytracing for Traveltime Tomography"*, Proceedings of SPIE, Mathematical Methods in Geophysical Imaging V, 3453, 70-81.

Other Implementation Modes of the Method According to the Invention

The method according to the invention thus permits access to any type of specular information after a Kirchhoff type prestack depth migration. It has been observed, for example, that the specular information relative to the position of the specular sources and receivers allows updating the velocity model of the studied underground zone by means of methods such as tomographic methods. By gaining access to other specular information, it is possible to improve the velocity updating process as shown in the following application examples.

In the case of an implementation of the method within the scope of a prestack time tomography application, with a view to higher efficiency, it is possible to do without the kinematic demigration stage. In this case, one directly accesses, by means of the method according to the invention, the traveltimes of the specular rays associated with the specular sources and receivers of different image points for different prestack classes. These traveltimes are evaluated independently of the method by the Kirchhoff type prestack depth migration algorithm. Thus, these traveltimes just have to be saved in an external file, in stages a) and b), in addition to the line parameters and the discriminant information on the position of the sources and receivers.

In the case of an implementation of the method within the scope of a prestack depth tomography application, with a view to higher efficiency, the partial derivatives of the traveltimes in relation to the velocity model used for implementing the prestack depth migration algorithm are advantageously produced by means of the present method. The partial derivatives of the rays travelling from the sources and receivers of the acquisition device to the image points considered for the classes considered are therefore calculated in stage a) and saved. Then, in stage b), the global partial derivatives of the source/receiver pairs saved during the imaging stage of the migration are calculated by summation of the individual partial derivatives of stage a) and stored.

According to another implementation mode, in order to limit the calculating time cost, stages a) to d) described above can be changed as follows:

a) The times and ray parameters associated with the source/image point and receiver/image point pairs are calculated and stored for a decimated representation of the image points and for a representation, also decimated, of the sources and receivers of the acquisition device;

b) the quantities related to the triplets {source; image point; receiver} are calculated for a decimation of image points and for all the traces that have contributed to each of these image points, for each considered prestack class. Reconstruction of the information for each real trace from a decimation in sources and receivers of the Green functions is done by interpolations (or interpolation of extrapolations by means of quantities referred to as paraxial) in use in Kirchhoff type imaging. The discriminant information on the source/receiver pair, the migration dip and the diffraction traveltime are stored in an external file for an image points decimation and for all the traces that have contributed to each of these image points, for each considered prestack class;

c) during the actual imaging stage of the migration algorithm used, these quantities are interpolated (or extrapolated) again for each image point from the decimated image points by a procedure referred to as "coarse nodes—fine nodes interpolation procedure". The depths and dips associated with the horizons interpreted on the migrated image thus formed are stored in an external file, for each prestack class, as described in stage c) for the general case;

d) then the discriminant information, dip and diffraction time quantities which correspond to the image points of the events interpreted at the end of stage c) are reconstructed from the file created in stage b) for decimated image points. In order to keep the coherence of the approach, these quantities are then interpolated by means of the "coarse nodes—fine nodes interpolation procedure" used for migration in stage c). Once the interpolation procedure completed, the discriminant information of the specular source/receiver pairs is produced according to the procedure described in stage d) for the general case, for each interpreted image point of each prestack class considered.

Thus, the method according to the invention allows access to the specular source/receiver pairs and to any specular information after a Kirchhoff type prestack depth migration stage. By means of these specular data, it is possible to update the velocity model using techniques such as tomographic techniques. The method also allows, by accessing specular data other than the position of the specular sources and receivers, to accelerate and simplify the velocity model updating process using a tomographic technique.

The invention claimed is:

1. A method for updating a distribution model of propagation velocities of seismic waves in an underground formation by determining specular source/receiver pairs associated with image points obtained from images of the underground formation resulting from multi-offset records, as a function of time, of seismic waves emitted and picked up by an acquisition device comprising seismic sources and seismic receivers coupled at the surface with the underground formation, the seismic waves being reflected by geologic interfaces of the formation, the method of the determining the specular source/receiver pairs comprising:

(a) defining a selection of image points of the images of the formation comprising at least one image point and adjacent points;

(b) carrying out a prestack depth migration for the selection of image points wherein data relative to the sources and receivers of the acquisition device, ray parameters of rays defined between any source/image point pair and the ray parameters of rays defined between any receiver/image point pair are determined and stored and, for at least one image point of the selection:

(c) determining, for the at least one image point, a local slope of at least one seismic event corresponding to reflections impacting one of the geologic interfaces of the formation;

(d) determining specular source/receiver pairs associated with the at least one image point, by comparing the local slope associated with the image point with ray parameters associated with the image point; and (e) modifying the distribution model of the propagation velocities of the seismic waves in the underground formation according to the determined specular source/receiver pairs.

2. A method as claimed in claim 1, wherein the specular source/receiver pairs associated with the at least one image point are determined by selecting from among all the source/receiver pairs of the acquisition device those pairs with a vector made up of a sum of the ray parameters associated with the at least one image point which is most colinear to a normal to the local slope associated with the at least one image point.

3. A method as claimed in claim 1, wherein the data stored during step b comprises at least one of:
   (e) the traveltimes of rays defined between any source/image point pair and any receiver/image point pair;
   (f) coordinates of sources and receivers of the acquisition device;
   (g) for any image point, migration dips associated with source/receiver pairs that have contributed to imaging thereof;
   (h) partial derivatives of the traveltimes in relation to a velocity model used for implementing a prestack depth migration algorithm; and
   (i) any combination of (e)-(h).

4. A method as claimed in claim 1, wherein data stored during step b are associated with each specular pair and stored in step d).

5. A method as claimed in claim 1, wherein the local slopes are determined from an interpretation of the seismic event.

6. A method as claimed in claim 1, wherein the ray parameters and the data relative to the sources and receivers of the device are calculated and stored for a decimated representation of the image points and a representation, also decimated, of the sources and receivers of the acquisition device.

7. A method as claimed in claim 6, wherein all of the ray parameters and the data relative to the sources and receivers of the device are reconstructed from interpolations and/or extrapolations.

8. A method as claimed in claim 1, wherein a depth tomography technique is used to update the model.

9. A method as claimed in claim 1, wherein a time tomography technique is used to update the model.

10. A method as claimed in claim 8, wherein partial derivatives of traveltimes in relation to a velocity model used for implementing a prestack depth migration algorithm, necessary for the depth tomography technique, are determined by evaluating and storing the information on the derivatives in step (b).

11. A method as claimed in claim 9, wherein the traveltimes necessary for said time tomography technique are determined by storing the information on the traveltimes in step (b).

12. A method as claimed in claim 2, wherein the ray parameters and the data relative to the sources and receivers of the device are calculated and stored for a decimated representation of the image points and a representation, also decimated, of the sources and receivers of the acquisition device.

13. A method as claimed in claim 3, wherein the ray parameters and the data relative to the sources and receivers of the device are calculated and stored for a decimated representation of the image points and a representation, also decimated, of the sources and receivers of the acquisition device.

14. A method as claimed in claim 4, wherein the ray parameters and the data relative to the sources and receivers of the device are calculated and stored for a decimated representation of the image points and a representation, also decimated, of the sources and receivers of the acquisition device.

15. A method as claimed in claim 5, wherein the ray parameters and the data relative to the sources and receivers of the device are calculated and stored for a decimated representation of the image points and a representation, also decimated, of the sources and receivers of the acquisition device.

16. A method as claimed in claim 12, wherein all of the ray parameters and the data relative to the sources and receivers of the device are reconstructed from interpolations and/or extrapolations.

17. A method as claimed in claim 13, wherein all of the ray parameters and the data relative to the sources and receivers of the device are reconstructed from interpolations and/or extrapolations.

18. A method as claimed in claim 14, wherein all of the ray parameters and the data relative to the sources and receivers of the device are reconstructed from interpolations and/or extrapolations.

19. A method as claimed in claim 15, wherein all of the ray parameters and the data relative to the sources and receivers of the device are reconstructed from interpolations and/or extrapolations.

20. A method as claimed in claim 16, wherein all of the ray parameters and the data relative to the sources and receivers of the device are reconstructed from interpolations and/or extrapolations.

21. A method for determining specular source/receiver pairs associated with image points obtained from images of an underground formation resulting from multi-offset records, as a function of time, of seismic waves emitted and picked up by an acquisition device comprising seismic sources and seismic receivers coupled at the surface with the underground formation, the seismic waves being reflected by geologic interfaces of the formation, the method of the comprising:
   (a) defining a selection of image points of the images of the formation comprising at least one image point and adjacent points;
   (b) carrying out a prestack depth migration for the selection of image points wherein data relative to the sources and receivers of the acquisition device, ray parameters of rays defined between any source/image point pair and the ray parameters of rays defined between any receiver/image point pair are determined and stored; and, for at least one image point of the selection:
   (c) determining, for the at least one image point, a local slope of at least one seismic event corresponding to reflections impacting one of the geologic interfaces of the formation; and
   (d) determining specular source/receiver pairs associated with the at least one image point, by comparing the local slope associated with the at least one image point with ray parameters associated with the at least one image point.

22. A method as claimed in claim 21, wherein the specular source/receiver pairs associated with the at least one image point are determined by selecting from among all the source/receiver pairs of the acquisition device those pairs with a vector made up of a sum of the ray parameters associated with the image point which is most colinear to a normal to the local slope associated with the at least one image point.

23. A method as claimed in claim 21, wherein the data stored during step b comprises at least one of:
   (e) the traveltimes of rays defined between any source/image point pair and any receiver/image point pair;
   (f) coordinates of sources and receivers of the acquisition device;
   (g) for any image point, migration dips associated with source/receiver pairs that have contributed to imaging thereof;

(h) partial derivatives of the traveltimes in relation to a velocity model used for implementing a prestack depth migration algorithm; and (i) any combination of (e)-(h).

24. A method as claimed in claim 21, wherein data stored during step (b) are associated with each specular pair and stored in step (d).

25. A method as claimed in claim 21, wherein the local slopes are determined from an interpretation of the seismic event.

26. A method as claimed in claim 21, wherein the ray parameters and the data relative to the sources and receivers of the device are calculated and stored for a decimated representation of the image points and a representation, also decimated, of the sources and receivers of the acquisition device.

* * * * *